United States Patent
Paul et al.

(10) Patent No.: US 6,926,266 B1
(45) Date of Patent: Aug. 9, 2005

(54) SHOCK ABSORBING ASSEMBLY FOR A PENCIL IGNITION COIL

(75) Inventors: Mark Albert Paul, Fishers, IN (US); Harry Oliver Levers, Jr., Muncie, IN (US)

(73) Assignee: Delphi Technologies, Inc., Troy, MI (US)

( * ) Notice: Subject to any disclaimer, the term of this patent is extended or adjusted under 35 U.S.C. 154(b) by 11 days.

(21) Appl. No.: 10/779,077

(22) Filed: Feb. 13, 2004

(51) Int. Cl.⁷ .............................. F16F 1/12; H01F 27/04
(52) U.S. Cl. ......................... 267/174; 267/179; 336/96; 336/92
(58) Field of Search ................................. 123/634, 635; 336/90, 92, 96, 107; 267/140, 152, 153, 33, 267/166, 174, 179, 286

(56) References Cited

U.S. PATENT DOCUMENTS

| | | | |
|---|---|---|---|
| 5,706,792 A * | 1/1998 | Boyer et al. ................ | 123/634 |
| 6,114,935 A * | 9/2000 | Oosuka et al. ............... | 336/107 |
| 6,252,483 B1 * | 6/2001 | Kawano et al. ............. | 336/189 |
| 6,724,289 B2 * | 4/2004 | Moga et al. .................. | 336/90 |
| 2001/0032636 A1 * | 10/2001 | Morganti et al. ........... | 123/633 |
| 2002/0158740 A1 * | 10/2002 | Paul et al. .................... | 336/96 |

* cited by examiner

Primary Examiner—Chris Schwartz
(74) Attorney, Agent, or Firm—Jimmy L. Funke

(57) ABSTRACT

A shock absorbing assembly reduces impact forces on a terminal of a spark plug that is mounted within a spark plug bore of an internal combustion engine when a pencil ignition coil is mounted thereto. The shock absorbing assembly includes a plug cup that is fixedly secured to the terminal end of the spark plug. A case cup is movably mounted to the plug cup. The case cup includes a resistor receptacle for receiving an end of a resistor therein. The shock absorbing assembly also includes a cup spring that extends between the plug cup and the case cup. The cup spring absorbs the impact forces of mounting the pencil ignition coil to the terminal of the spark plug.

14 Claims, 4 Drawing Sheets

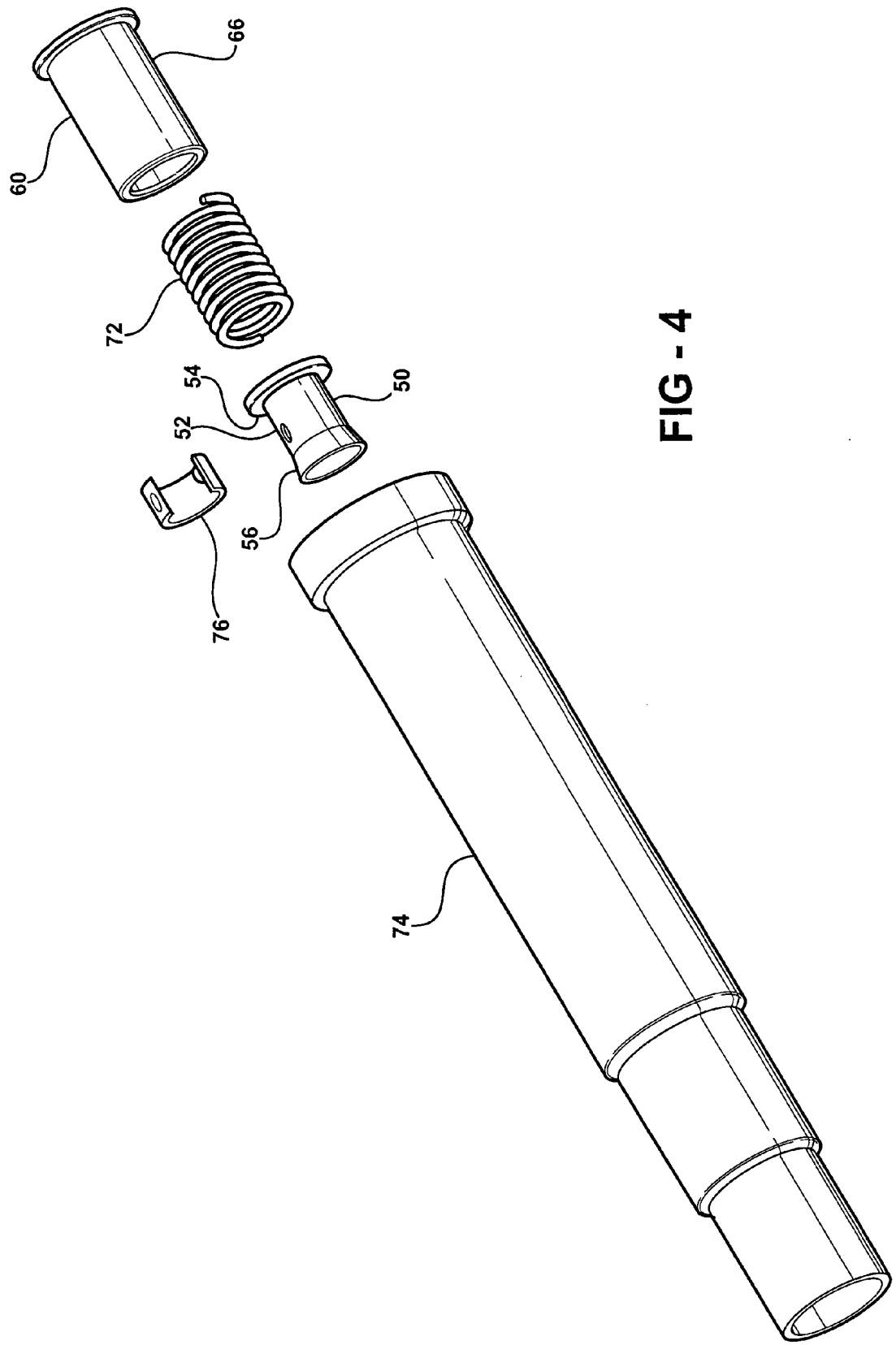

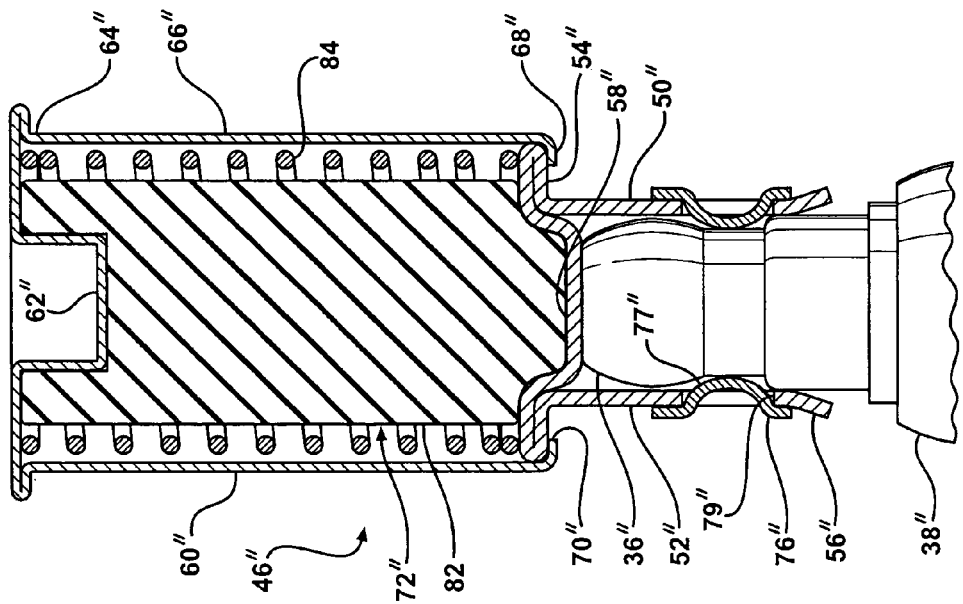
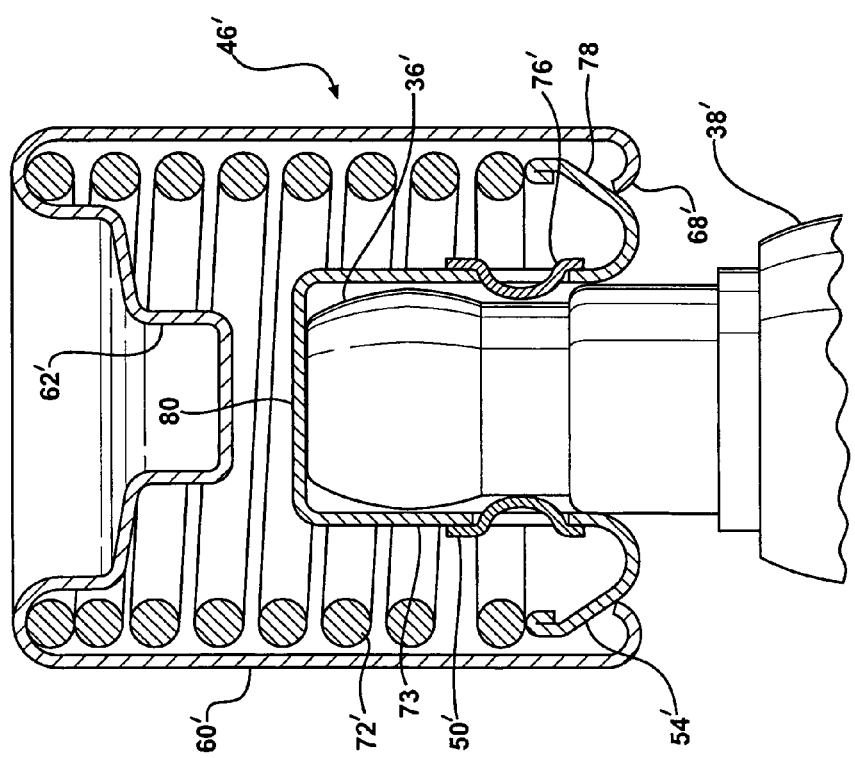

SHOCK ABSORBING ASSEMBLY FOR A PENCIL IGNITION COIL

BACKGROUND ART

1. Field of the Invention

The invention relates to an internal combustion engine spark ignition system. More specifically, the invention relates to a pencil ignition coil designed to be mounted to a spark plug without damaging the pencil ignition coil or the spark plug.

2. Description of the Related Art

The internal combustion engine can be categorized in several ways. One such way to categorize the internal combustion engine is whether the design requires a spark to combust the fuel within cylinders of the internal combustion engine. Diesel engines do not require a spark to be generated within the cylinders thereof. Non-diesel consuming internal combustion engines do, however, require a spark to ignite the fuel within the cylinders thereof.

With regard to non-diesel internal combustion engines the design thereof include the utilization of pencil ignition coils to operate the spark plugs. Recent developments in internal combustion engines include coils, sometimes called pencil coils, that are designed to be mounted directly to the spark plug. In addition, the pencil ignition coil is designed to primarily extend through the spark plug bore of the internal combustion engine. In other words, the pencil ignition coil is a long, thin pencil ignition coil designed to utilize the wasted space of the spark plug bore of the internal combustion engine.

Inherent in the design of a pencil ignition coil is the requirement that the pencil ignition coil be positively mounted to the engine and electrically connected with the terminal of the spark plug. Once the spark plug has been screwed into the spark plug bore, one way to positively mount to the engine and electrically connect the pencil ignition coil to the spark plug is to friction fit the pencil ignition coil over the terminal of the spark plug. To ensure the pencil ignition coil does not disengage the spark plug during the operation of the internal combustion engine, the friction fit (or press fit) must be strong enough to withstand operational forces that might jar the pencil ignition coil from the spark plug. Creating the friction fit is problematic because the impact force used to create the friction fit by forcing the pencil ignition coil over the spark plug may cause damage to the pencil ignition coil or the spark plug. If such damage occurs, either the spark plug and/or the pencil ignition coil will have to be replaced prematurely.

SUMMARY OF THE INVENTION

A shock absorbing assembly reduces impact forces on a terminal of a spark plug that is mounted within a bore of an internal combustion engine when a pencil ignition coil is mounted thereto. The shock absorbing assembly includes a plug cup that is fixedly secured to the terminal end of the spark plug. A case cup is movably mounted to the plug cup. The case cup includes a resistor receptacle for receiving an end of a resistor therein. The shock absorbing assembly also includes a cup spring that extends between the plug cup and the case cup. The cup spring absorbs the impact forces of mounting the pencil ignition coil to the terminal of the spark plug.

BRIEF DESCRIPTION OF THE DRAWINGS

Advantages of the invention will be readily appreciated as the same becomes better understood by reference to the following detailed description when considered in connection with the accompanying drawings, wherein:

FIG. 4 is an exploded perspective view of one embodiment of the invention;

FIG. 5 is a cross-sectional side view of a second embodiment of the invention mounted to a terminal of the spark plug; and FIG. 6 is a side cross-sectional view of a third embodiment of the invention.

DETAILED DESCRIPTION OF THE PREFERRED EMBODIMENT

Figure 1:
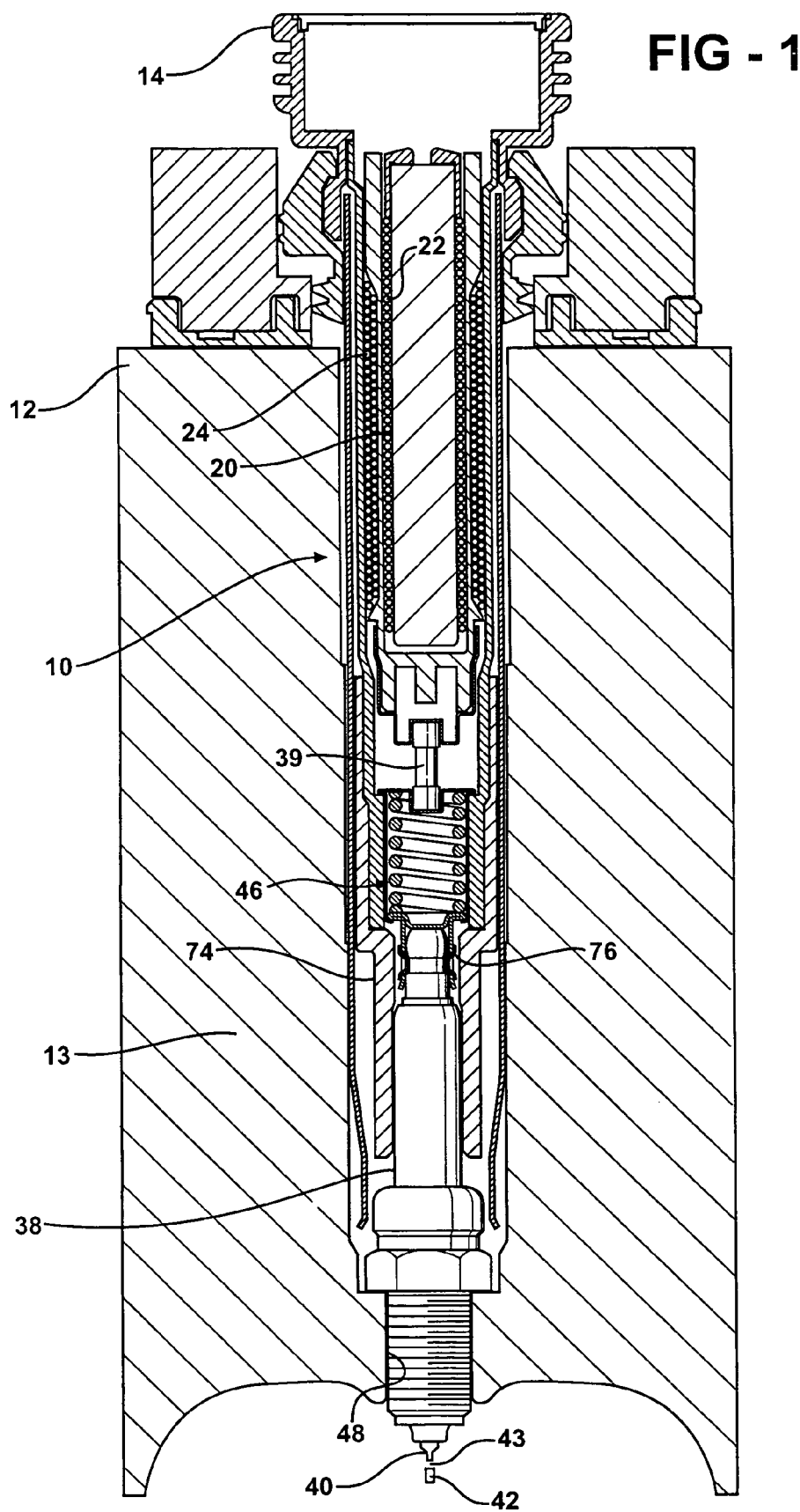
FIG. 1 is a cross-sectional side view of one embodiment of the invention mounted in a spark plug bore of an internal combustion engine.
Figure 2:
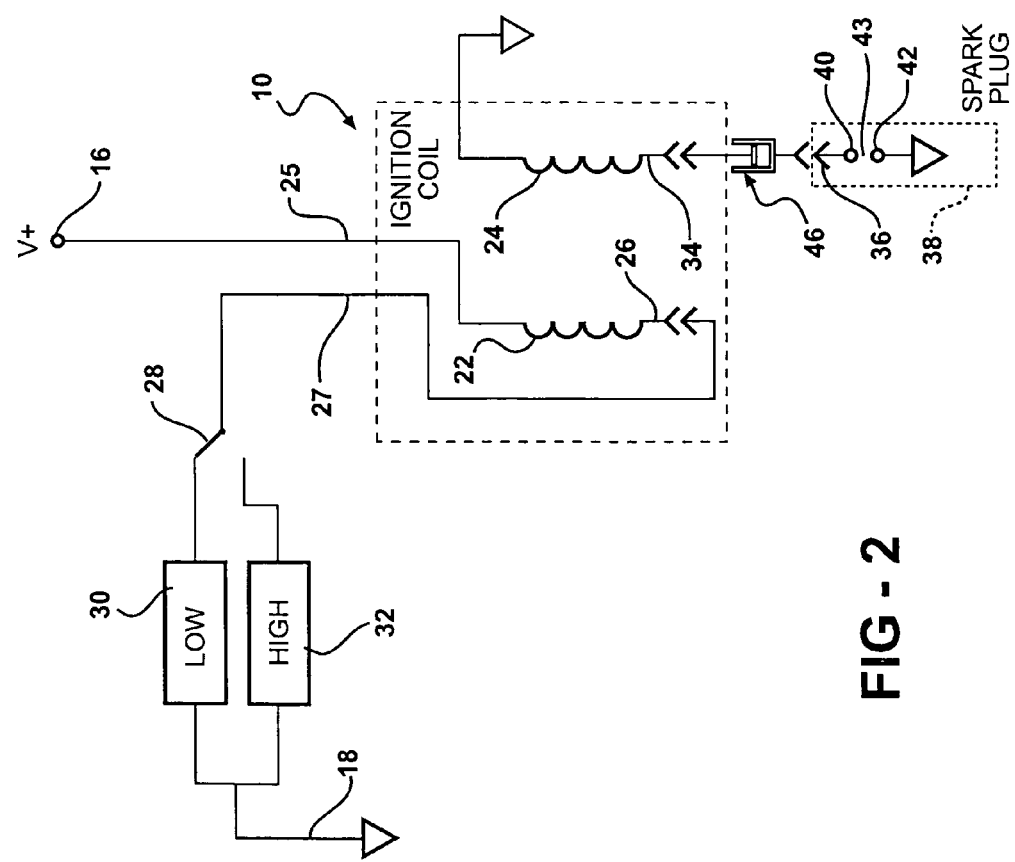
FIG. 2 is an electrical schematic of a pencil ignition coil and spark plug utilizing the invention.

Referring to FIGS. 1 and 2, a side view of a pencil ignition coil, generally indicated at 10, is shown mounted within an engine head 12 of an internal combustion engine 13. The pencil ignition coil 10 includes a cover 14 that extends out of the engine head 12 and provides for electrical connection to a voltage source 16 as well as being operatively connected to ground 18, as is best seen in FIG. 2.

The pencil ignition coil 10 also includes a ferromagnetic core 20 that is surrounded by a primary winding 22 and a secondary winding 24. The primary winding 22 is connected to the voltage source 16 through a first terminal 25. The secondary winding 24 is connected to ground on the low voltage side. A subsequent end 26 of the primary winding 22 is connected through a second terminal 27 to a switch 28 that switches between a low impedance 30 and a high impedance 32. A subsequent end 34 of the secondary winding 24 is operatively connected to a terminal 36 of a spark plug 38 through a resistor 39. The spark plug 38 includes two terminals 40, 42 that define a gap 43. When the switch 28 switches from the low impedance 30 to the high impedance 32, a current is generated in the secondary winding 24 forcing current to pass between the two terminals 40, 42, creating a spark in the gap 43 therebetween. This spark ignites the fuel within a cylinder 44 of the internal combustion engine 13.

Extending between the pencil ignition coil 10 and the spark plug 38 is a shock absorbing assembly, generally indicated at 46. The shock absorbing assembly 46 reduces the impact forces on the terminal 36 of the spark plug 38. More specifically, the spark plug 38 is threaded within a spark plug bore 48 of the engine head 12. The pencil ignition coil 10 must be mounted on the terminal 36 of the spark plug 38. The forces generated to secure the pencil ignition coil 10 to the terminal 36 are absorbed by the shock absorbing assembly 46 disposed therebetween.

Figure 3:
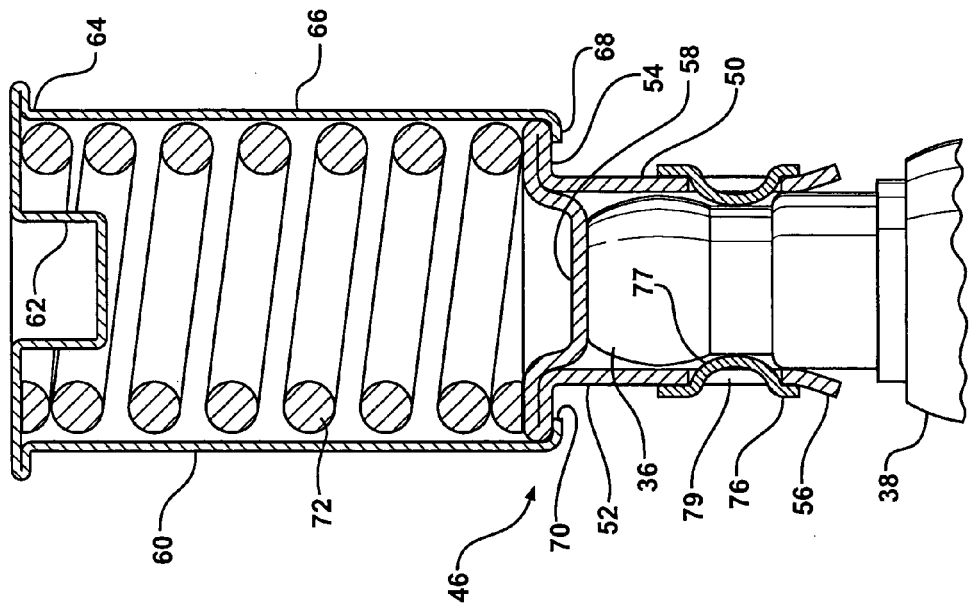
FIG. 3 is a sectional view of one embodiment of the invention.

Referring to FIG. 3, a side view of one embodiment of the shock absorbing assembly 46 is shown. The shock absorbing assembly 46 includes a plug cup 50 that is fixedly secured to the terminal 36 of the spark plug 38. The plug cup 50 includes a cylindrical body 52 and a case receiving flange 54 extending thereout at one end of the cylindrical body 52. More specifically, the case receiving flange 54 extends outwardly perpendicular to a side wall of the cylindrical body 52. The cylindrical body 52 includes an angled distal end 56 to aid the plug cup 50 as it is being inserted over the terminal 36. Depending on the design of the pencil ignition coil 10, the engine head 12 and the spark plug 38, the case receiving flange 54 may include a terminal boss 58 extending down into the cylindrical body 52 to properly position the plug cup 50 with respect to the terminal 36.

The shock absorbing assembly 46 also includes a case cup 60. The case cup 60 is movably mounted to the plug cup 50. The case cup 60 includes a resistor receptacle 62 that extends at a coil end 64 of the case cup 60. The resistor receptacle 62 receives the resistor 39 therein. The case cup 60 includes a case cylinder 66 that extends between the pencil ignition coil 10 and the plug cup 50. The case cylinder 66 includes a locking lip 68 that extends inwardly from the case cylinder 66. The locking lip 68 engages the case receiving flange 54 and prevents the plug cup 50 from disengaging the case cup 60. The locking lip 68 defines an aperture 70 through which the plug cup 50 extends.

The plug 50 and case 60 cups are manufactured from a drawing operation. While these parts may be manufactured using a standard screw machine operation, the drawing operation is a more efficient way to manufacture the plug 50 and case 60 cups without compromising performance.

The shock absorbing assembly 46 also includes a cup spring 72 that extends between the plug cup 50 and the case cup 60. It is the cup spring 72 that absorbs the impact forces of the mounting of the pencil ignition coil 10 onto the terminal 36 of the spark plug 38. In the embodiment shown in FIG. 3, the cup spring 72 is a compression coil spring that is fabricated from a ferromagnetic material. It is important that the cup spring 72 be fabricated from a material that conducts electricity so that the pencil ignition coil 10 can make sufficient electrical contact with the spark plug 38 to generate the appropriate spark. As may be seen from FIG. 3, the case cup 60 and the plug cup 50 are coaxial.

Referring to FIG. 4, it can be seen that the case cup 60, the cup spring 72 and the plug cup 50 are all coaxial with a case 74 that receives the pencil ignition coil 10 therein. While the case 74 is shown to have multiple sections having different diameters, it should be appreciated by those skilled in the art that the shape of the case 74 may vary so long as it maintains the elements therein coaxial. A terminal clip 76 is fitted around the cylindrical body 52 of the plug cup 50 to secure the plug cup 50 to the terminal 36. In one embodiment, the terminal clip 76 includes detents 72 that extend into holes 79 or recesses in the plug cup 50. It should be appreciated by those skilled in the art that the terminal clip 76 may be configured in other shapes. In particular, the terminal clip 76 may be fabricated in a three-leaf combination similar to that shown in U.S. Pat. No. 6,358,071, which is hereby incorporated by reference.

Referring to FIG. 5, wherein like prime numerals represent elements similar to those found in the first embodiment, a shock absorbing assembly 46' is shown secured to a terminal 36' of a spark plug 38'. The plug cup 50' is designed to be received within the case cup 60' and the cup spring 72'. The plug cup 50' includes a terminal receiving cylinder 73 that extends into the case cup 60' and the cup spring 72'. The case receiving flange 54' is designed such that it includes an angled surface 78. The angled surface 78 engages the locking lip 68' of the case cup 60'. The case receiving flange 54' is opposite a terminal abutting end 80 of the plug cup 50'. The shock absorbing assembly 46' is designed to allow the plug cup 50' to extend within the case cup 60' at an angle that is not coaxial with the case cup 60'. This allows the pencil ignition coil 10 to be mounted within the engine head 12 at an angle with respect to the terminal 36 of the spark plug 38.

In a second alternative embodiment, wherein like double primed reference characters represent elements similar to those found in the preferred embodiment, the shock absorbing assembly 46" includes a composite cup spring 72". The composite cup spring 72" includes a primary spring element 82 and a secondary spring element 84. The primary spring element 82 is made of an elastomeric material and is capable of absorbing impact forces when the pencil ignition coil 10 is mounted to the terminal 36" of the spark plug 38". The secondary spring element 84 is a winding that provides secondary shock absorbing characteristics of the composite cup spring 72". More importantly, the secondary spring element 84 provides an electrical path maintaining the electrical connection between the pencil ignition coil 10 and the spark plug 38". It may be appreciated by those skilled in the art that the secondary spring element 84 may be replaced with another element that has minimal spring characteristics so long as the path for the electrical current between the pencil ignition coil 10 and the spark plug 38" is maintained.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A shock absorbing assembly for reducing impact forces on a terminal of a spark plug mounted in a bore of an engine head when a pencil ignition coil is being mounted to the terminal of the spark plug, said shock absorbing assembly comprising:
    a plug cup fixedly secured to the terminal of the spark plug;
    a case cup movably mounted to said plug cup, said case cup including a resistor receptacle for receiving an end of a resistor therein; and;
    a cup spring extending between said plug cup and said case cup for absorbing the impact forces of mounting the pencil ignition coil to the terminal of the spark plug.

2. A shock absorbing assembly as set forth in claim 1 wherein said plug cup includes a case receiving flange for locking said case cup in position with respect to said plug cup.

3. A shock absorbing assembly as set forth in claim 2 wherein said case cup includes a locking lip for engaging said case receiving flange to prevent said case cup from disengaging said plug cup.

4. A shock absorbing assembly as set forth in claim 3 wherein said case cup and said plug cup are coaxial.

5. A shock absorbing assembly as set forth in claim 4 wherein said cup spring includes an electrically conductive member.

6. A shock absorbing assembly as set forth in claim 5 wherein said case receiving flange includes an angled surface to allow the pencil ignition coil to extend at an angle with respect to the spark plug.

7. A shock absorbing assembly as set forth in claim 6 wherein said plug cup includes a terminal receiving cylinder.

8. A shock absorbing assembly as set forth in claim 5 including a spring clip engagable with said plug cup for maintaining said plug cup in contact with the terminal of the spark plug.

9. A shock absorbing assembly as set forth in claim 8 wherein said spring clip includes detents extending inwardly.

10. A shock absorbing assembly as set forth in claim 9 wherein said plug cup includes a plurality of holes to receive said detents of said spring clip therein and to allow said detents to contact the terminal end of the spark plug.

11. A shock absorbing assembly as set forth in claim 10 wherein said plug cup is manufactured via a drawing operation.

12. A shock absorbing assembly as set forth in claim 11 wherein said case cup is manufactured via a drawing operation.

13. A shock absorbing assembly for reducing impact forces on a terminal spark plug mounted in a bore of an engine head when a pencil ignition coil is being mounted to the terminal of the spark plug said shock absorbing assembly comprising:

a plug cup fixedly secured to the terminal of the spark plug, said plug cup including a case receiving flange, said case receiving flange including an angled surface to allow the pencil ignition coil to extend at an angle with respect to the spark plug;

a case cup movably mounted to said plug cup, said case cup including a resistor receptacle for receiving an end of a resistor therein; and a cup spring extending between said plug cup and said case cup for absorbing the impact forces of mounting the pencil ignition coil to the terminal of the spark plug.

14. A shock absorbing assembly as set forth in claim 13 wherein said cup spring includes an electrically conductive member.

* * * * *